Patented July 13, 1937

2,086,753

UNITED STATES PATENT OFFICE 2,086,753

PROCESS OF WATER PURIFICATION

Oliver M. Urbain and William R. Stemen, Columbus, Ohio, assignors to Charles H. Lewis, Harpster, Ohio No Drawing. Application August 7, 1935, Serial No. 35,203

4 Claims. (Cl. 210—2)

This invention relates to a novel water purification process developed by us.

Specifically, the process of the present invention is concerned with the oxidation of the organic compounds present in the water in true solution. Known processes have been developed for removing the suspended and colloidal matter from polluted water, sewage and the like but these processes for the most part yield an effluent that still contains substantial polluting substances in true solution. It is to the removal of these polluting substances in true solution in the effluents from purification processes that the present invention is especially well adapted.

The biochemical oxygen demand (B. O. D.) of the organic matter present in true solution in sewage, for example, varies from about thirty parts per million (30 P. P. M.) in weak sewage to two hundred fifty parts per million (250 P. P. M.) in strong sewage and as high as several thousand parts per million in some industrial wastes, such as packing house waste and whey. The elimination of this fraction is, therefore, an important problem.

The process of the present invention contemplates a method for oxidizing the organic substances present in true solution in the water directly with oxygen in a short period of time. Direct oxidation of organic substances has been the subject of extensive research. The present invention has been developed through such research.

In the widely used activated sludge process the oxidation is carried on through biological agencies, namely, Protozoa and bacteria in the presence of an excess of diffused oxygen. In this method, the process of oxidation requires from four to six hours which delay is a very serious objection to the process. Furthermore, the biological balances are so delicate that favorable conditions required to effect any substantial oxidation are seldom attained. The entire equilibrium of this process is destroyed by the presence of any of the so-called industrial wastes and by slight changes in the pH of the sewage. These factors have made the installation of the activated sludge process in industrial cities extremely hazardous.

It is an important purpose of the present invention to provide an oxidation process requiring only a short oxidation period; also to provide such a process that will not be subject to variations in the composition of the sewage.

Another object of the invention is to provide a process that may be utilized in connection with present activated sludge process installations, as well as with chemical precipitation processes.

We have found that the organic constituents present in true solution in sewage can be oxidized to a sufficiently low B. O. D. to be, for all practical purposes, stable. We accomplish this direct oxidation by passing diffused air through the solution in the presence of metallic iron and sulfonated coal.

The term "sulfonated coal" employed in the present specification and claims is intended to embrace sulfonated carbonaceous materials produced as hereinafter outlined.

In the preparation of the sulfonated carbonaceous materials suitable for use in the invention, any of the following carbonaceous materials may be used: bituminous coal, anthracite coal, lignite, cannel coal, peat and coke.

The carbonaceous material selected is first finely powdered to say 10 to 50 mesh.

The finely powdered material is then treated with any of the following reagents:—

1—100% sulfuric acid.
2—Fuming sulfuric acid.
3—Dilute sulfuric acid.
4—Solution of sulfuric and hydrochloric acids.
5—Solution of sulfuric and halosulfonic acids.

The solution selected is added to the finely divided carbonaceous material and the mass agitated until the evolution of $SO_2$ gas is complete. When the evolution of $SO_2$ gas has ceased, the end point of the various reactions is indicated. Heat accelerates the reactions.

Pressure also accelerates the reactions. The finished product has a volume about twice that of the raw carbonaceous material employed. The porosity is very greatly increased as a result of the swelling of the material. As shown by the low ash content of the finished product, the inorganic constituents of the raw material are very greatly reduced by the treatment. The principal reaction which takes place is the oxidation of certain constituents of the carbonaceous material, as evidenced by the evolution of $SO_2$, the sulfuric acid being reduced to sulfurous acid. The sulfo group (—$SO_3$—H) is introduced into the finished product. The finished product not only contains active carbon but, which is of more importance, it contains active hydrogen which is acidic in nature.

After the material is prepared, it is water washed and ready for use.

The iron should be employed in the form of borings or added as powdered iron.

The mode of carrying out the process is as follows: The suspended and colloidal matter present in the polluted water to be treated is first removed, preferably by a suitable chemical precipitation process, and the clarified effluent is then treated by adding thereto approximately fifty pounds of "sulfonated coal" per million gallons. The liquid is then agitated to thoroughly distribute the added material therethrough and then passed, preferably downwardly, through a bed of metallic iron borings countercurrent to the flow of diffused air in excess, the flow being so controlled that the solution carrying the "sulfonated coal" will be maintained in intimate contact with the metallic iron in the presence of the diffused air for a time period of substantially thirty minutes.

The effluent following the treatment with diffused air may have added thereto from ten to fifty pounds of calcium hydroxide and ten to twenty pounds of ferrous sulfate per million gallons, and agitated from one to two minutes. The precipitate is allowed to settle and the purified effluent is drawn off. This effluent is virtually completely purified both from the standpoint of oxygen demand and pathogenic microorganisms.

While we are not thoroughly conversant with the theory underlying the success of our improved process, we firmly believe that it embraces auto oxidation, induced oxidation and catalytic oxidation.

Having thus described our process, what we claim as our invention is:—

1. A process for oxidizing the organic constituents present in true solution in water comprising oxidizing said organic constituents in the presence of a carbonaceous material selected from the group including sulfonated and sulfated coal, peat, and coke, and metallic iron.

2. A process for treating water containing organic constituents in true solution therein comprising passing diffused air through the water in the presence of a carbonaceous material selected from the group including sulfonated and sulfated coal, peat, and coke, and finely divided metallic iron.

3. A process for oxidizing organic matter present in water comprising adding to the water containing said organic matter a carbonaceous material selected from the group including sulfonated and sulfated coal, peat, and coke, and then passing the same in contact with a bed of metallic iron and diffused air in excess for a time period adequate to oxidize said organic matter.

4. A process for oxidizing organic matter present in true solution in water comprising adding to the water substantially fifty pounds of a carbonaceous material selected from the group including sulfonated and sulfated coal, peat, and coke, per million gallons, then passing the water through a bed of metallic iron borings while in contact with diffused air in excess, for a time period adequate to effect substantial oxidation of said organic matter.

OLIVER M. URBAIN.
WILLIAM R. STEMEN.